(12) United States Patent
Madsen et al.

(10) Patent No.: US 9,107,344 B2
(45) Date of Patent: Aug. 18, 2015

(54) CONTROL SYSTEM OF AGRICULTURAL VEHICLE WITH GOODS CARRIER, AGRICULTURAL VEHICLE, AND METHOD OF CONTROLLING GOODS CARRIER OF AGRICULTURAL VEHICLE

(75) Inventors: Tommy Ertbolle Madsen, Virum (DK); Morten Rufus Blas, Copenhagen (DK); Kristian Kirk, Helsingen (DK)

(73) Assignee: CLAAS E-Systems KGaA mbH & Co KG, Guetersloh (DE)

( * ) Notice: Subject to any disclaimer, the term of this patent is extended or adjusted under 35 U.S.C. 154(b) by 271 days.

(21) Appl. No.: 12/868,885

(22) Filed: Aug. 26, 2010

(65) Prior Publication Data

US 2011/0064274 A1 Mar. 17, 2011

(30) Foreign Application Priority Data

Sep. 7, 2009 (EP) .................................... 09169622

(51) Int. Cl.
*G06K 9/00* (2006.01)
*A01D 43/08* (2006.01)

(52) U.S. Cl.
CPC .................................. *A01D 43/087* (2013.01)

(58) Field of Classification Search
USPC .......................................... 382/104, 154, 100
See application file for complete search history.

(56) References Cited

U.S. PATENT DOCUMENTS

| 7,983,821 B2* | 7/2011 | Reeves ............................. 701/50 |
| 2002/0106108 A1* | 8/2002 | Benson et al. ................. 382/104 |
| 2003/0174207 A1* | 9/2003 | Alexia et al. ..................... 348/89 |
| 2007/0071311 A1* | 3/2007 | Rovira-Mas et al. ......... 382/154 |
| 2007/0165908 A1* | 7/2007 | Braeunl et al. ................ 382/104 |
| 2007/0280528 A1* | 12/2007 | Wellington et al. ........... 382/154 |
| 2009/0276108 A1* | 11/2009 | Kumar et al. ................... 701/20 |
| 2010/0108188 A1 | 5/2010 | Correns et al. |

FOREIGN PATENT DOCUMENTS

| DE | 44 26 059 | 2/1996 |
| DE | 10 2007 009 666 | 8/2008 |
| EP | 1 344 445 | 9/2003 |
| EP | 2 020 174 | 2/2009 |
| JP | 56064605 | 6/1981 |
| JP | 2008182945 | 8/2008 |

* cited by examiner

*Primary Examiner* — Hadi Akhavannik
(74) *Attorney, Agent, or Firm* — Michael J. Striker (57) ABSTRACT

A control system controlling a goods carrier of an agricultural vehicle for conveying goods to a target area, has a 3D imaging device providing frames imaging the target area, a data processor and a memory. The control system derives information from the frames and operates to obtain a reference frame comprising 3D information about the pose of the target area, identify a plurality of characteristic points of the target area in the reference frame, obtain a new frame, analyze the new frame to identify a plurality of characteristic points, search and match characteristic points in the reference frame and the new frame, analyze pairs of matched characteristic points to establish a group of pairs showing a common change of pose between the reference frame and the new frame, and provide a signal taking into account results of the latter analysis.

17 Claims, 4 Drawing Sheets

CONTROL SYSTEM OF AGRICULTURAL VEHICLE WITH GOODS CARRIER, AGRICULTURAL VEHICLE, AND METHOD OF CONTROLLING GOODS CARRIER OF AGRICULTURAL VEHICLE

CROSS-REFERENCE TO RELATED APPLICATION

The invention described and claimed hereinbelow is also described in European Patent Application EP 09169622.9 filed on Sep. 7, 2009. This European Patent Application, whose subject matter is incorporated here by reference, provides the basis for a claim of priority of invention under 35 U.S.C. 119(a)-(d).

The present application contains a subject matter which can be similar to the subject matter disclosed in U.S. patent application Ser. No. 12/868,856 filed Aug. 26, 2010.

BACKGROUND OF THE INVENTION

The present invention relates to a control system of an agricultural vehicle controlling a controllable goods carrier of the agricultural vehicle, especially a discharge spout of a forage harvester, for conveying goods to a target area, said control system comprising a 3D imaging device for providing frames imaging at least part of the target area, a data processor and a memory, said control system deriving information from the frames for controlling the goods carrier.

The invention further relates to an agricultural vehicle comprising a control system, and to a method of controlling a controllable goods carrier of an agricultural vehicle by means of a control system.

DE 44 26 059 A1 discloses a harvester with an ejecting spout or discharge spout for ejecting harvested material into a crop-carrying container of a transport wagon. A camera is attached to the lower side of the spout at a distance from its ejecting end. The camera provides an image of the end of the spout and the open top of the crop-carrying container, said image being transferred to a monitor in the driver's cabin. It is further suggested that image processing is used to provide control of the spout to maintain it aimed at the open top of the crop-carrying container in order to automatically ensure that the ejected crop will always hit its target: the open top of the crop-carrying container.

EP 1 344 445 A1 discloses a harvester with an ejecting spout or discharge spout with a hood for directing material ejected from the spout. A camera is attached to the hood and thus the camera will always have its direction of view parallel to the direction of ejecting of the spout. It is suggested to use two cameras and to stitch together two images provided thereby thus providing a larger field of view. In the alternative only one camera may be used at a time, namely the camera providing the best image.

EP 2 020 174 A1 suggests using e.g. a stereo camera attached to a spout of a harvester for providing three-dimensional or 3D images of a transport or storage container, into which the spout is pouring harvested goods to load the container therewith, to be able to control the spout and the transfer of goods. It is suggested to derive from the images so-called patterns of the storage container, its surroundings, and the filling level of goods in the storage container, respectively. The patterns can be structured as 3D patterns, shape patterns, texture patterns and/or color patterns. It is further suggested that based on the shifts of these patterns from one image to the next it is possible to derive the speed of travel and steering movement of the harvester, the speed of travel and steering movement of the storage container, and variations of loading conditions and variations of the position of the spout in space, respectively.

When conveying goods to a target area by means of a goods carrier, e.g. a discharge spout of a forage harvester, and monitoring the conveyance by means of a 3D imaging device, e.g. a stereo camera, problems may arise due to dust and bits of goods, e.g. leaves and parts of leaves, scattered in the air around the goods carrier and in the area between the goods carrier and the target area and creating noise in the images provided by the 3D imaging device. This in turn makes it difficult to control the goods carrier in an appropriate manner based on the images. Thus it is hard for prior art control systems to distinguish the target area and goods that is deposited in the target area from noise such as dust and debris scattered in the air between the goods carrier and the target area.

SUMMARY OF THE INVENTION

It is an object of the present invention to overcome or minimise this problem.

This is achieved by means of a control system of an agricultural vehicle controlling a controllable goods carrier of the agricultural vehicle, especially a discharge spout of a forage harvester, for conveying goods to a target area, said control system comprising a 3D imaging device for providing frames imaging at least part of the target area, a data processor and a memory, said control system deriving information from the frames for controlling the goods carrier, and said control system operating to obtain a reference frame comprising 3D information about the pose of at least part of the target area, identify a plurality of characteristic points or distinctive features of the target area in the reference frame, obtain from the 3D imaging device a new frame imaging at least a part of the target area, analyse the new frame to identify a plurality of characteristic points in the new frame, search and match characteristic points in the reference frame and the new frame, analyse pairs of matched characteristic points to establish a group of pairs showing a common change of pose between the reference frame and the new frame, and said control system operating to provide a signal taking into account results of the latter analysis. By identifying a group of pairs of characteristic points showing a common change of pose a group of image points belonging to the surface of a common rigid body is identified. This rigid body will be the target area and goods deposited in the target area.

As used herein "pose" means position and attitude (or orientation). Thus a change of pose is a combination of a change of position effected by a translation and a change of attitude effected by a rotation around an axis. Thus points showing a common change of pose are points that are moved from their position in the reference frame to their position in the new frame by a common translation and a common rotation around a common axis.

Thus image points showing dust and debris are so-to-speak filtered out while points belonging with large certainty to the target area, are identified.

In a preferred embodiment the control system operates to provide said signal taking into account said common change of pose and/or the relative positions of the individual pairs of matched characteristic points in the group of pairs showing a common change of pose. By taking into account the common change of pose the current position of the target relative to the agricultural vehicle can be established and preferably said signal is a control signal for controlling the goods carrier, thus providing for keeping the goods carrier aimed at the target. By taking into account the relative positions of the individual pairs of matched characteristic points in the group of pairs showing a common change of pose, the degree of filling of different areas of the target can be monitored, and the signal can be a control signal for controlling the goods carrier in order to follow a filling strategy.

In a preferred embodiment the system comprises a monitor and said signal comprises an information signal displayed on the monitor. When taking into account the relative positions of the individual pairs of matched characteristic points in the group of pairs showing a common change of pose, in this embodiment the degree of filling of different areas of the target can be indicated clearly on the monitor, e.g. for a driver of the vehicle to monitor the filling of the target or to perform controlling actions to follow a filling strategy.

Preferably the control system operates to establish a pose of the target area corresponding to the reference frame and to update said pose taking into account said common change of pose. Hereby is obtained that the current pose of the target area may be established even in case of a current image comprising to much noise for establishing the pose based on the image per se.

Preferably the control system operates to establish the pose of at least part of the target area in a reference system, preferably a reference system of the agricultural vehicle.

Preferably the control system further operates to update the pose of the target area in said reference system. Hereby is obtained that the pose of the target area is established also for parts of the target area outside the image of a current frame.

Preferably the control system operates to establish surfaces of the target area and to establish individual pairs of matched characteristic points in the group of pairs showing a common change of pose, that are not positioned on a surface of the target area, as indicating a surface of the goods conveyed to the target area. Hereby is obtained that points of the surface of goods deposited in the target area are established with great certainty making it possible with corresponding great certainty to establish the amount of deposited goods or the degree of filling of the target area with the goods. It should be noted that the overall surface of goods deposited in the target area is generally a mobile surface due to new material more or less continuously arriving from the goods carrier. However the entire surface is generally not changing simultaneously, but individual areas of the surface are still from time to time. Thus characteristic points belonging to individual currently still areas of the surface of the goods deposited in the target area may be searched and matched in two successive images e.g. obtained at an interval of 0.2-0.3 second.

Preferably the control system comprises means for establishing the pose of at least part of the target area said means providing a measure of degree of reliability of the established pose, said control system operating to update the pose of the target area using the pose established by the means for establishing the pose, when said degree of reliability is high. Hereby is obtained that the pose is always established with great certainty, as a drifting effect of establishment by summing minor changes of pose from frame to frame is avoided.

In a preferred embodiment the means for establishing the pose of at least part of the target area comprises means for analysing a 3D frame. Hereby is obtained that the pose can be established from a frame provided by the 3D imaging device, thus avoiding a need for a separate device for establishing the pose.

Preferably the control system comprises means for establishing the position and direction of view of the 3D imaging device, and the control system operates to disregard points in the 3D frames indicating positions below a specific level below the 3D imaging device. In this way it is possible to filter out irrelevant parts of an image, which might introduce noise. Such irrelevant parts might be the ground surrounding the target area.

In a further preferred embodiment the control system operates to establish areas of expectation within which the searching of characteristic points in the reference frame and/or the new frame for matching is performed. Hereby is obtained that individual characteristic points may be searched with in a limited area of an image reducing the processing time, and areas of an image wherein relevant characteristic points are not expected may be excluded from search thus avoiding possible noise.

In a further embodiment the control system operates to search and match characteristic points in the new frame with characteristic points in several previously obtained frames. Hereby is obtained that more characteristic points representing the surface of the target area or the goods deposited there may be found in the new frame. Further a more certain change of pose may be established when comparing the pose of the characteristic points in the new frame with the poses of characteristic points in several frames obtained over a longer time span than the time span or interval between two successive frames.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
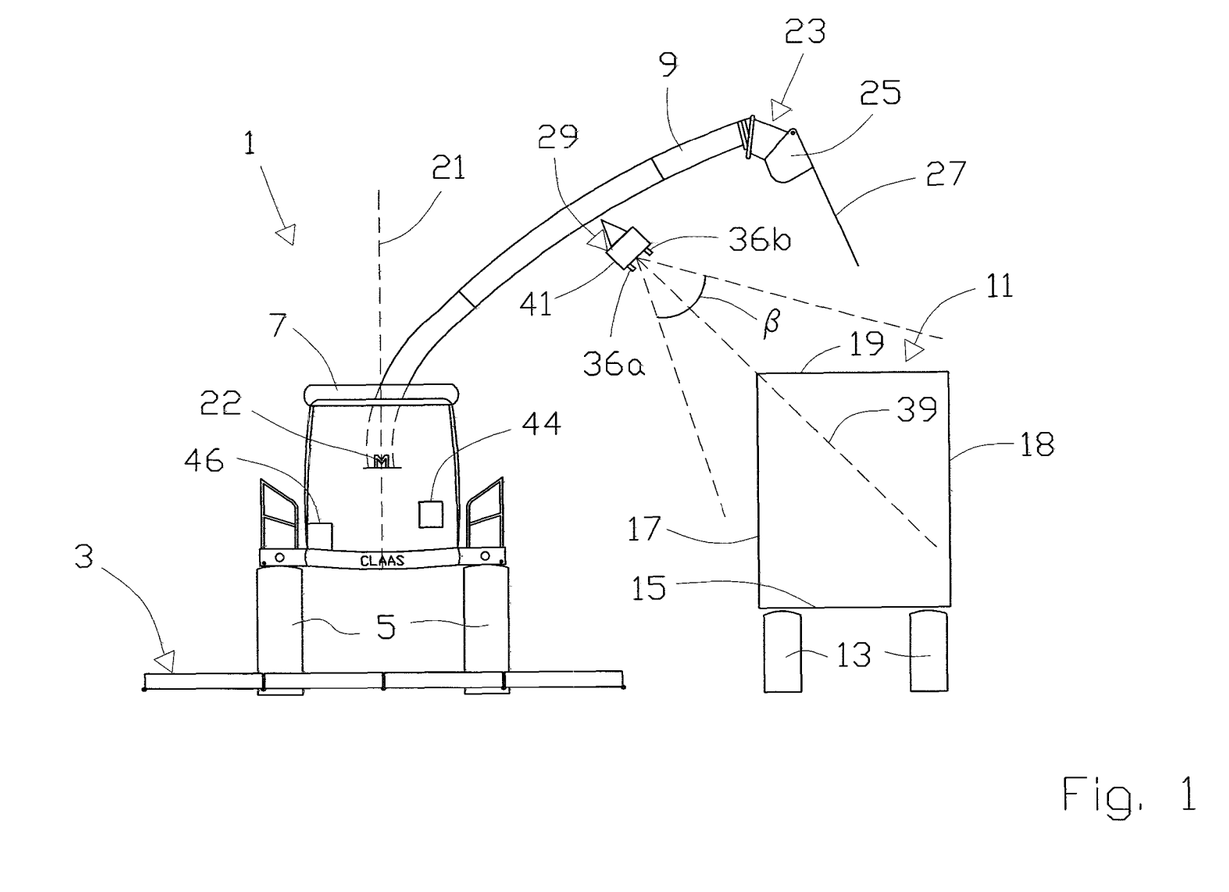
FIG. 1 shows a forage harvester and transport wagon.

FIG. 1 shows in a front view a forage harvester 1 with a header 3, ground wheels 5, a driver's cabin 7 and a discharge or ejecting spout 9. During work the header 3 will harvest a crop, which is processed by the harvester 1 and ejected from the spout 9. To collect the ejected crop a transport wagon 11 is driven alongside the forage harvester 1. Of the transport wagon 11 only ground wheels 13 and a crop-carrying container with a bottom 15, sidewalls 17, 18 and an open top 19, is shown in FIG. 1.

The spout 9 is in a manner known per se mounted on the harvester 1 to be rotatable in a controlled manner around a vertical axis 21 by means of actuators indicated by numeral 22. A gauge is attached to the actuator 22, whereby the position of the spout 9 relative to the harvester 1 is known. The spout 9 is elongated and has an outer end 23 provided with an adjustable hood 25 for directing a crop stream 27 ejected from the spout 9.

A 3D imaging device in the form of a stereo camera 29 is mounted on the spout 9 on the lower side thereof and at a distance from the outer end 23. The stereo camera 29 comprises two cameras, e.g. CCD cameras or video cameras, with objective lenses 36a and 36b, respectively, having a mean view direction 39 of the stereo camera 29. The two cameras are accommodated in a common housing 41.

The stereo camera is preferably a wide-angle camera with a large viewing angle β allowing the camera to "see" simultaneously the open top 19 and the nearest sidewall 17 of the crop-carrying container of the transport wagon 11 as indicated in FIG. 1.

In the embodiment shown, apart from the joint providing for the rotation of the spout 9 around the vertical axis 21, the spout 9 does not comprise any joints between the body of the harvester 1 and the camera 29. Thus the position of the stereo camera 29, especially its height above the ground, is always known. It is envisaged that the spout in alternative embodiments comprises joints allowing the spout to be raised and lowered changing the overall geometry of the spout. In such embodiments gauges might be attached to the joints to allow establishment of the current geometry of the spout and thus of the height of the stereo camera's position above the ground.

The provision of the stereo camera 29 provides for obtaining monochrome (or even color) images as well as disparity images of the crop-carrying container. The monochrome images may e.g. be transferred to a monitor 44 in the driver's cabin to enable or help the driver monitoring the process of transferring crop to the transport wagon 11 as it is known per se, while the disparity image is suited as an input for automatic or semi-automatic control.

Thus the forage harvester 1 comprises a control device 46 with a data processor and a memory. The control device receives images or frames, i.e. data files comprising pixel information of the images, from the stereo camera 29 and process the images.

In the present embodiment the control device 46 uses prior art software to process the stereo images received from the stereo camera 29. Thus the control device 46 receives a stereo frame comprising a "left" and a "right" frame provided respectively by the two objective lenses 36a and 36b. It should be noted that "left" and "right" are used in relation to the two frames or pictures provided by the two objective lenses, as it is normal in relation to stereo vision, even though in the present embodiment the lenses are positioned one above the other rather than side by side. The control device 46 processes the stereo frame to provide a disparity picture, i.e. a picture comprising depth information i.e. 3D information. Normally the disparity picture is obtained analysing e.g. the left frame pixel by pixel, search for each pixel the corresponding pixel in the right frame and calculate the distance from the camera to the point imaged by those pixels by triangulation. Information of this distance is attached to the pixel of the left frame, which thus comprises the 3D information and constitutes the disparity picture. The disparity picture is processed by the control device 46 using prior art software to recognise and locate the transport wagon 11, especially the mainly horizontal rim 51 of the open top 19.

This requires a fairly good stereo picture without too much noise. Such pictures are frequently obtainable during operation, but also frequently they are not obtainable e.g. due to debris and dust flowing in the air around and below the spout 9.

If the control device 46 cannot with a sufficient degree of reliability recognise and locate the transport wagon on basis of a given frame it fails to establish the pose of the rim.

Having obtained a stereo frame or picture without too much noise and having therefrom established the pose of the rim 51 of the open top it is possible to maintain or adjust the position of the spout 9 to aim the crop stream ejected by the spout at the target i.e. the open top 19 to fill the container of the transport wagon 11.

The transport wagon 11 comprises, as mentioned, two sidewalls i.e. a proximal sidewall 17 and a distal sidewall 18 relative to the harvester 1. Further the transport wagon 11, or its crop carrying container, comprises a front wall 20a and a rear wall 20b. Correspondingly the rim 51 comprises a proximal rim part 51a, a distal rim part 51b, a front rim part 51c and a rear rim part 51d.

Having established the pose of the rim 51 in a stereo picture the area of the picture between the proximal rim part 51a and the distal rim part 51b may be analysed pixel by pixel, and pixels which from the information of the disparity picture are adjudged to represent points situated mainly vertically below the distal rim part 51b are assigned to the distal sidewall 18.

The information of the stereo frame, i.e. the disparity picture, is stored in the memory of the control device 46 together with information about the pose of the rim 51. The pose of the rim is referenced to the harvester 1. Thus the pose, i.e. position and attitude, of the rim 51 and therewith the transport wagon 11 relative to the harvester 1 is established.

Due to the fact that the position or height of the stereo camera 29 above the ground is known, it is possible to filter out information relating to the ground, e.g. by eliminating any information relating to positions below 50 cm above the ground level. Elimination of information in this way reduces noise and data processing.

Having obtained and stored in this way information of a frame from which it has been possible to establish the pose of the rim 51 or at least a part of the rim comprising either the front rim part 51c or the rear rim part 51d together with adjacent parts of the proximal rim part 51a and the distal rim part 51b, this frame is denoted "reference frame".

Figure 4:
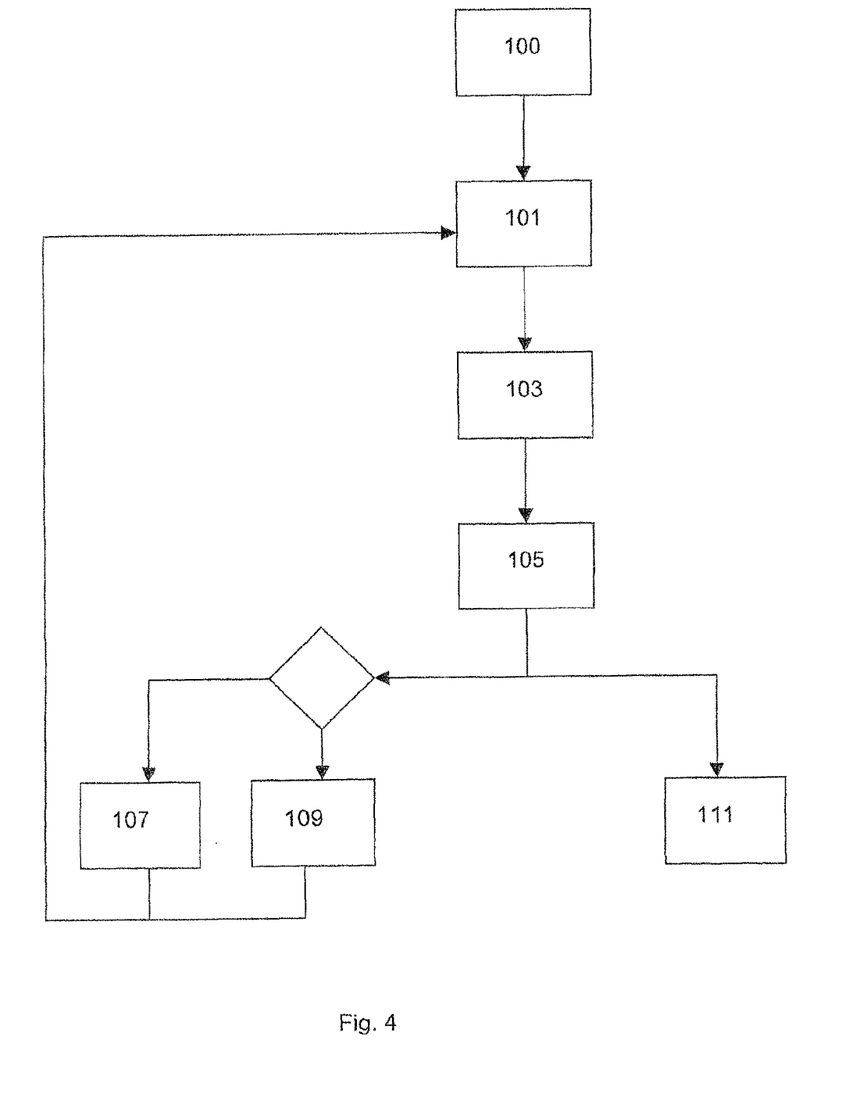
FIG. 4 shows a flow chart illustrating a method in accordance with the present invention.

Referring to FIG. 4 the system proceeds as follows having obtained a reference frame in an initial step 100. In a first step 101 characteristic points are identified in the reference frame. In a second step 103 a new stereo frame is obtained from the stereo camera 29 and the new stereo frame is analysed to seek and identify characteristic points or distinctive features in the new stereo frame.

In a third step 105 characteristic points found in the reference frame and the new stereo frame, respectively are matched to establish a group of characteristic points showing a common change of pose from the reference frame to the new stereo frame. The common change of pose thus found corresponds to the change of pose of the transport wagon 11 relative to the stereo camera 29 during the time span between obtaining the reference frame and the new stereo frame.

If the quality of the new stereo frame is not sufficient to establish the pose of the rim 51 or part thereof as explained above then in a fourth step 107 the pose of the rim 51 registered together with the information of the reference frame is updated by the common change of pose as a new pose, and the control device 46 may provide any control signal appropriate to keep the crop stream ejected by the spout 9 aimed at the target, i.e. the open top 19 or a determined place within the open top 19.

If the quality of the new stereo frame is sufficient to determine the pose of the rim 51 or part thereof, the new stereo frame is in an alternative fourth step 109 used as a new reference frame.

Figure 2:
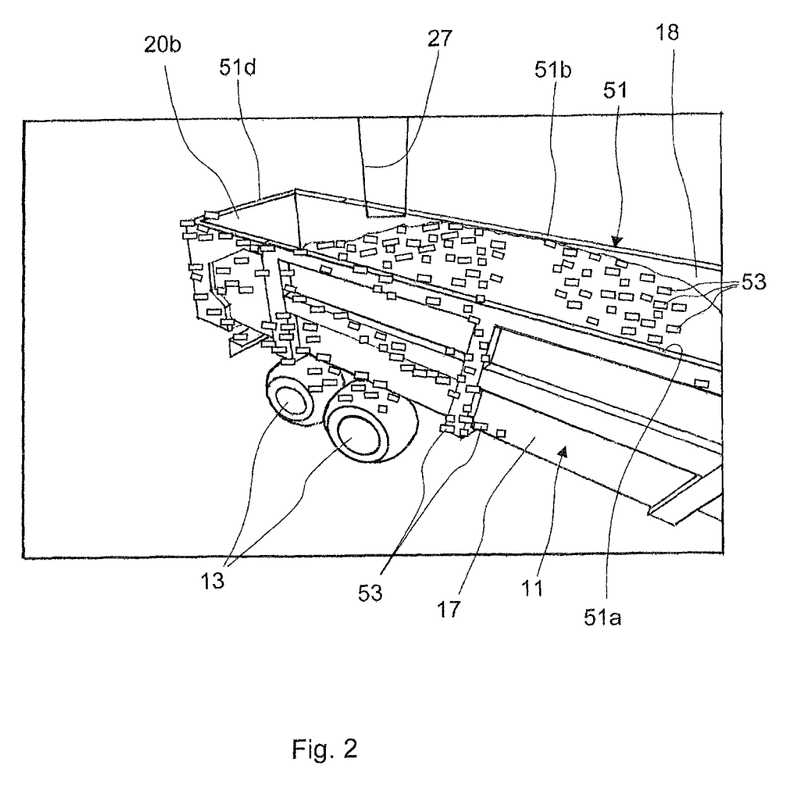
FIG. 2 shows an image of the transport wagon in accordance with the present invention.

FIG. 2 shows a picture of a transport wagon 11 wherein characteristic points found in said picture and a subsequent new picture are indicated as lines 53 extending between pairs of matched characteristic points. It is seen that no points are found on the surrounding ground, which has been filtered out as mentioned above. The crop stream 27 entering the container of the transport wagon 11 is seen and it is noticed that no matched characteristic points are found in the crop stream 27 or at its place of impact inside the transport wagon 11. This is due to the fact that around the crop stream 27 dusty conditions are present creating noise and the surface of the crop deposited in the transport wagon 11 is kind of vivid or mobile in the area of impact of the crop stream due to the continuous arrival of crop. These conditions make it impossible to determine the actual position of the surface of the crop deposited in the transport wagon 11 based on a single 3D image because for a given point or pixel found in the 3D image it is not possible to determine whether the point actually belongs to the surface of deposited crop or whether it belongs to the flowing crop stream 27. However next to the place of impact of the crop stream the surface will locally be at rest during the time span between obtaining two subsequent frames and thus it is possible to identify and match characteristic points of the surface of the deposited goods. These points reliably indicate the current surface of the deposited crop, thus providing for determining the degree of filling of the container of the transport wagon 11.

As mentioned above pixels positioned between the distal and the proximal rim parts 51b and 51a are analysed to be possibly assigned to the distal side wall 18. Identified and matched characteristic points positioned between the distal and the proximal rim parts 51b and 51a are assigned to the surface of deposited crop if they are not assigned to the distal side wall 19.

Figure 3:
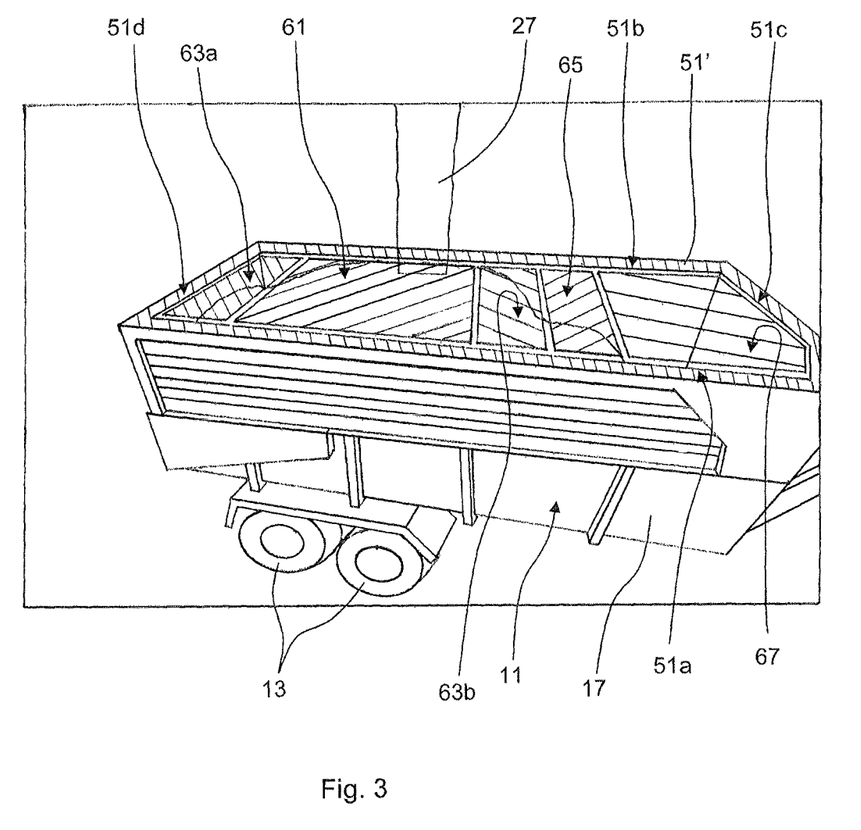
FIG. 3 shows another image of the transport wagon in accordance with the present invention.

In a fifth step 111 (FIG. 4) a signal is sent to the monitor 44 as information for the driver or operator of the harvester 1. Thus FIG. 3 shows a monitor picture of a transport wagon 11 in which the rim 51 has been indicated by means of signals provided by the software recognising and locating the rim. The indication of the rim has the form of a picture frame 51' generated by the control device 46 and superposed the picture provided from the camera i.e. one of the two objectives 36a and 36b. Further the degree of filling is indicated gradually for various longitudinal sections of the transport wagon 11 by picture fields 61, 63a, 63b, 65 and 67 generated by the control device 46 and superposed the picture provided from the camera. This indication of the degree of filling tells which parts of the container of the transport wagon has been sufficiently filled and which parts still have room for more crop.

Preferably colors are used to indicate various degrees of filling of different areas, e.g. indicating by a red color that an area has been filled (field 61), indicating by a green color areas that are far from filled (field 67), and indicating by one or more yellow nuances areas, which are close to being filled (field 63a, 63b and 65).

Subsequently to the fourth and fifth steps the method returns to the first step 101 using the information of the up-dated reference frame.

Identifying characteristic points in the first step 101 and the second step 103 may be performed by any known method e.g. by any known method of so-called "Blob detection" or any known method of so-called "Corner detection". These methods provide a response for a pixel or small group of pixels centred around a pixel. A pixel having a response, but for which another pixel having a more pronounced response is found in its local neighbourhood, is rejected since weak responses are likely to cause noise.

Matching of characteristic points in the third step 105 may be performed on basis of texture analysis of the vicinity of the respective points or features. Such analysis is made by means of a so-called "Feature descriptor", of which several are known in the art, e.g. Zero-mean Normal Cross Correlation, the SURF (Speeded Up Robust Features) descriptor and the SIFT (Scale-invariant feature transform) descriptor.

When matching a characteristic point found in the new stereo frame with a characteristic point in the reference frame, then the search for a possible match may be restricted to an area, where the correct match is expected to be found. Thus areas which are expected not to relate to the transport wagon 11, but its surroundings e.g. on an external side the front rim part, may be excluded.

Determining the Common Change of Pose:

The stereo camera 29's and the transport wagon 11's mutual change of pose during the time between one frame (the reference frame) and another frame (the new stereo frame) is described by a transformation matrix M:

$$M = \begin{pmatrix} R & T \\ 0\ 0\ 0 & 1 \end{pmatrix}$$

where
R is a 3 by 3 matrix (3 rows and 3 columns) expressing the rotation about three spatial axes, and
T is a 3 by 1 matrix defining the translation in three spatial directions;
M is thus a 4 by 4 matrix.

If $P_a$ designates the reference frame of a time a and $P_b$ designates the new stereo frame of a later time b, i.e. a<b, then $P_b = M_{ab} * P_a$, where $M_{ab}$ is a matrix expressing the transformation from a to b.

Cf. the third step 105 mentioned above, M is in an embodiment of the present invention established by a RANSAC method:

If $f_{as}$ is characteristic point No. s in $P_a$, which have been matched with $f_{bs}$, which is characteristic point No. s in $P_b$, and correspondingly $f_{at}$ is characteristic point No. t in $P_a$, which have been matched with $f_{bt}$, which is characteristic point No. t in $P_b$, and $f_{au}$ is characteristic point No. u in $P_a$, which have been matched with $f_{bu}$, which is characteristic point No. u in $P_b$, and if $f_s$, $f_t$ and $f_u$ are non-collinear, then $$f_{bs} = M_{ab} * f_{as}$$
$$f_{bt} = M_{ab} * f_{at},$$
$$f = \begin{bmatrix} x \\ y \\ z \\ 1 \end{bmatrix},$$

where $x, y, z$ are the spatial coordinates of $f$ $$f_{bu} = M_{ab} * f_{au}$$

constitutes an equation system from which $M_{ab}$ can be calculated.

$M_{ab}$ is according to a RANSAC method calculated as estimate a large number of times for randomly selected three matched pairs of characteristic points $f_a$ and $f_b$. Once an estimate of $M_{ab}$ is thus calculated it is tested against the other matched pairs of characteristic points in $P_a$ and $P_b$. Here through a best estimate of $M_{ab}$ is established. Matched pairs of characteristic points, which according to the best estimate of $M_{ab}$ appear to be mis-matches, are rejected as outliers.

By the present invention several advantageous effect may be obtained:

In periods when images obtained by the stereo camera 29 are of a poor quality it is still possible to keep track off the mutual position of the stereo camera (and thus the harvester) and a target i.e. the transport wagon.

It is possible reliable to detect the current surface of a material in the target i.e. of crop in the transport wagon and thus the degree of filling (of the wagon).

Further due to the fact that the pose of the rim or part thereof is established and information is stored, at least in a preferred embodiment, it is possible to keep track of either end of the container of the wagon i.e. the front rim part 51c and the rear rim part 51d, once the respective rim part has been within the view of the camera 29, even if the entire rim 51 is not within the view of the camera, i.e. is not represented in a given stereo frame, at any time.

It will be understood that each of the elements described above, or two or more together, may also find a useful application in other types of constructions differing from the types described above.

While the invention has been illustrated and described as embodied in a control system of an agricultural vehicle with goods carrier, agricultural vehicle and method of controlling goods carrier of the agricultural vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A control system of an agricultural vehicle controlling a controllable goods carrier of the agricultural vehicle, for conveying goods to a target area, said control system comprising a 3D imaging device for providing frames imaging at least part of the target area; a data processor; and a memory; wherein said control system operation comprises:
    deriving information from the frames for controlling the goods carrier,
    operating to obtain a reference frame comprising 3D information about the target area corresponding to the reference frame,
    identifying a plurality of characteristic points of the target area in the reference frame,
    obtaining from the 3D imaging device a new frame imaging the target area,
    analyzing the new frame to identify a plurality of characteristic points of the target area in the new frame,
    searching and matching characteristic points of the target areas in the reference frame and the new frame,
    analyzing pairs of matched characteristic points to establish a group of pairs showing a common change of an amount of the goods between the target areas in the reference frame and the new frame,
    updating the target area in the reference frame taking into account said common change of the amount of goods; and
    providing a control signal for controlling delivery of the goods by the goods carrier positioned at the target area by taking into account the common change in the amount of goods within the target area determined by the analyzing.

2. A control system as defined in claim 1, wherein the control system provides said control signal by further taking into account relative positions of individual pairs of matched characteristic points in a group of pairs showing a common change of pose.

3. A control system as defined in claim 1, further comprising a monitor, wherein said control signal is an information signal displayed on the monitor.

4. A control system as defined in claim 1, wherein the control system operates to establish the pose of at least part of the target area in a reference system.

5. A control system as defined in claim 4, wherein the control system operates to establish the pose of at least part of the target area in the reference system of the agricultural vehicle.

6. A control system as defined in claim 1, wherein the control system operates to establish surfaces of the target area and to establish individual pairs of matched characteristic points in a group of pairs showing a common change of pose, that are not positioned on a surface of the target area, as indicating a surface of the goods conveyed to the target area.

7. A control system as defined in claim 1, further comprising means for establishing a pose of at least part of the target area, said means providing a measure of degree of reliability of the established pose, said control system operating to update the pose of the target area using the pose established by the means for establishing the pose, when said degree of reliability is high.

8. A control system as defined in claim 7, wherein said means for establishing the pose of at least part of the target area comprises means for analyzing a 3D frame.

9. A control system as defined in claim 1, further comprising means for establishing a position and direction of view of the 3D imaging device, and the control system operates to disregard points in the 3D frames indicating positions below a specific level below the 3D imaging device.

10. A control system as defined in claim 1, wherein the control system operates to establish areas of expectation within which a searching of characteristic points in the reference frame and/or the new frame for matching is performed.

11. A control system as defined in claim 1, wherein the control system operates to search and match characteristic points in the new frame with characteristic points in several previously obtained frames.

12. A controls system as defined in claim 1, wherein the controllable goods carrier is a discharge spout of a forage harvester.

13. An agricultural vehicle, comprising a control system controlling a controllable goods carrier of the agricultural vehicle, for conveying goods to a target area, said control system comprising a 3D imaging device for providing frames imaging at least part of the target area; a data processor; and a memory; wherein said control system operation comprises:
    deriving information from the frames for controlling the goods carrier,
    operating to obtain a reference frame comprising 3D information about an amount of goods in the target area corresponding to the reference frame,
    identifying a plurality of characteristic points of the amount of goods in the target area in the reference frame,
    obtaining from the 3D imaging device a new frame imaging the amount of goods in the target area,
    analyzing the new frame to identify a plurality of characteristic points of the amount of goods in the target area in the new frame,
    searching and matching characteristic points in the reference frame and the new frame,
    analyzing pairs of matched characteristic points to establish a group of pairs showing a common change of the amount of goods in the target area between the reference frame and the new frame, and updating the reference frame taking into account said common change of the amount of goods in the target area, and providing a control signal for controlling the goods carrier to deliver the goods to the target area by taking into account the common change of the amount of goods in the target area.

14. An agricultural vehicle as defined in claim 13, wherein the controllable goods carrier is a discharge spout of a forage harvester.

15. A method of controlling by a control system a controllable goods carrier of the agricultural vehicle, for conveying goods to a goods container, said control system comprising a 3D imaging device for providing frames imaging at least part of the goods container, a data processor and a memory, said method comprising the steps of:

obtaining a reference frame comprising 3D information about the at least part of the goods container, identifying a plurality of characteristic points of the at least part of the goods container in the reference frame, obtaining from the 3D imaging device a new frame imaging the at least part of the goods container corresponding to the reference frame, analyzing the new frame to identify a plurality of characteristic points in the new frame, searching and matching characteristic points in the reference frame and the new frame, analyzing pairs of matched characteristic points to establish a group of pairs showing a common change of at least part of the goods container between the reference frame and the new frame, and updating the at least part of the goods container reference frame taking into account said common change of a fill level the goods in the at least part of the container, and providing a control signal for controlling the goods carrier to deliver the goods to the at least part of the container by taking into account results of the analyzing.

16. A method of controlling as defined in claim 15, wherein the controllable goods carrier is a discharge spout of a forage harvester.

17. A control system as defined in claim 1, wherein the change of goods is a change in a degree of filling of the target area with the conveyed goods using the goods carrier.

* * * * *